(12) United States Patent
Otsuki et al.

(10) Patent No.: US 11,969,887 B2
(45) Date of Patent: Apr. 30, 2024

(54) TRANSPORTATION SYSTEM, TRANSPORTATION METHOD AND PROGRAM

(71) Applicant: TOYOTA JIDOSHA KABUSHIKI KAISHA, Toyota (JP)

(72) Inventors: Nobuhisa Otsuki, Toyota (JP); Kunihiro Iwamoto, Toyota (JP); Yuta Itozawa, Nagoya (JP); Hirotaka Komura, Tokyo-to (JP); Yutaro Takagi, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 234 days.

(21) Appl. No.: 17/487,191

(22) Filed: Sep. 28, 2021

(65) Prior Publication Data
US 2022/0105621 A1 Apr. 7, 2022

(30) Foreign Application Priority Data
Oct. 2, 2020 (JP) .................................. 2020-168119

(51) Int. Cl.
*B25J 9/00* (2006.01)
*B66F 9/06* (2006.01)
*G05D 1/00* (2006.01)
*G05D 1/02* (2020.01)

(52) U.S. Cl.
CPC .......... *B25J 9/0009* (2013.01); *G05D 1/0217* (2013.01); *B66F 9/063* (2013.01); *G05D 2201/0216* (2013.01)

(58) Field of Classification Search
CPC ................. B25J 9/0009; G05D 1/0217; G05D 2201/0216; B66F 9/063; B66F 9/18; B60D 1/465; B65G 1/137; B60P 1/64
See application file for complete search history.

(56) References Cited

U.S. PATENT DOCUMENTS

| 7,100,725 | B2 | 9/2006 | Thorne |
| 10,286,558 | B1 | 5/2019 | Asada et al. |
| 11,117,759 | B2 * | 9/2021 | Elazary .................. B65G 59/02 |
| 2007/0048118 | A1 | 3/2007 | Ogawa et al. |
| 2007/0140817 | A1 * | 6/2007 | Hansl ....................... B66F 9/07 414/277 |

(Continued)

FOREIGN PATENT DOCUMENTS

| CN | 108583396 A * | 9/2018 |
| CN | 108583396 A | 9/2018 |

(Continued)

*Primary Examiner* — Khoi H Tran
*Assistant Examiner* — Dairon Estevez
(74) *Attorney, Agent, or Firm* — Dinsmore & Shohl LLP

(57) ABSTRACT

The traveling unit main body and the accommodation unit are adapted to be uncoupled and re-coupled. The traveling unit main body includes a first driving unit and a second driving unit configured to perform at least one of operations of taking out or storing the article from or in the accommodation unit and transporting the article taken out from the accommodation unit. The traveling unit main body performs at least one of the operations of taking out, storing, and transporting the article using the first driving unit and the second driving unit in a state in which the traveling unit main body and the accommodation unit are uncoupled.

9 Claims, 16 Drawing Sheets

(56) References Cited

U.S. PATENT DOCUMENTS

| | | | |
|---|---|---|---|
| 2007/0288123 A1* | 12/2007 | D'Andrea | G05D 1/021 |
| | | | 700/214 |
| 2010/0234995 A1 | 9/2010 | Zini et al. | |
| 2017/0166399 A1 | 6/2017 | Stubbs et al. | |
| 2018/0165782 A1 | 6/2018 | Ibe | |
| 2018/0329426 A1 | 11/2018 | Gupta et al. | |
| 2019/0220000 A1 | 7/2019 | Ibe | |
| 2019/0242916 A1 | 8/2019 | Guarracina et al. | |
| 2019/0317498 A1 | 10/2019 | Mere | |
| 2020/0175468 A1 | 6/2020 | Tsuruta et al. | |
| 2021/0179403 A1* | 6/2021 | Nakamura | G05D 1/021 |

FOREIGN PATENT DOCUMENTS

| | | |
|---|---|---|
| CN | 111242526 A | 6/2020 |
| JP | S60-205712 A | 10/1985 |
| JP | 2007-061964 A | 3/2007 |
| JP | 2017-200846 A | 11/2017 |
| JP | 6413899 B2 | 10/2018 |
| WO | 2017141679 A1 | 8/2017 |

* cited by examiner

TRANSPORTATION SYSTEM, TRANSPORTATION METHOD AND PROGRAM

CROSS REFERENCE TO RELATED APPLICATIONS

This application is based upon and claims the benefit of priority from Japanese patent application No. 2020-168119, filed on Oct. 2, 2020, the disclosure of which is incorporated herein in its entirety by reference.

BACKGROUND

The present disclosure relates to a transportation system, a transportation method and a program.

U.S. Pat. No. 7,100,725 discloses a transportation robot in which a compartment for accommodating an item(s) is placed on a traveling unit main body or is coupled to the traveling unit main body so that the compartment can be towed.

SUMMARY

In such a technique, it is desirable to perform not only accommodation and transportation of an item(s) but also to perform a series of tasks including loading and unloading of the item(s).

The present disclosure has been made in order to solve the problem mentioned above and provides a transportation system and a transportation method in which not only can an item(s) be accommodated and transported, but also the accommodated item(s) can be loaded and unloaded.

A transportation system according to an embodiment includes a transportation robot that includes a traveling unit main body and an accommodation unit for accommodating an article, the traveling unit main body and the accommodation unit being configured to be coupled to each other, in which:
 the traveling unit main body and the accommodation unit are adapted to be uncoupled and re-coupled;
 the traveling unit main body includes a driving unit configured to perform at least one of operations of taking out or storing the article from or in the accommodation unit and transporting the article taken out from the accommodation unit; and
 the traveling unit main body is configured to perform at least one of the operations of taking out, storing, and transporting the article using the driving unit in a state in which the traveling unit main body and the accommodation unit are uncoupled.

A transportation method according to an embodiment is a transportation method for a transportation robot that includes a traveling unit main body and an accommodation unit for accommodating an article, the traveling unit main body and the accommodation unit being configured to be coupled to each other, in which:
 the traveling unit main body and the accommodation unit are adapted to be uncoupled and re-coupled; and
 the traveling unit main body includes a driving unit configured to perform at least one of operations of taking out or storing the article from or in the accommodation unit and transporting the article taken out from the accommodation unit, the method including
 causing the traveling unit main body to perform at least one of the operations of taking out, storing, and transporting the article using the driving unit in a state in which the traveling unit main body and the accommodation unit are uncoupled.

A computer program according to an embodiment is causing a computer to perform a transportation method for a transportation robot that comprises a traveling unit main body and an accommodation unit for accommodating an article, the traveling unit main body and the accommodation unit being configured to be coupled to each other, wherein:
 the traveling unit main body and the accommodation unit are adapted to be uncoupled and re-coupled; and
 the traveling unit main body comprises a driving unit configured to perform at least one of operations of taking out or storing the article from or in the accommodation unit and transporting the article taken out from the accommodation unit, the method comprising
 causing the traveling unit main body to perform at least one of the operations of taking out, storing, and transporting the article using the driving unit in a state in which the traveling unit main body and the accommodation unit are uncoupled.

According to the present disclosure, it is possible to provide a transportation system, a transportation method and a program in which an item(s) can be accommodated and transported, and the accommodated item(s) can be loaded and unloaded.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, the present disclosure will be described through embodiments of the present disclosure. However, the embodiments are not intended to limit the scope of the present disclosure according to the claims. Further, not all of the components/structures described in the embodiments are necessarily indispensable for solving the problem.

Figure 1:
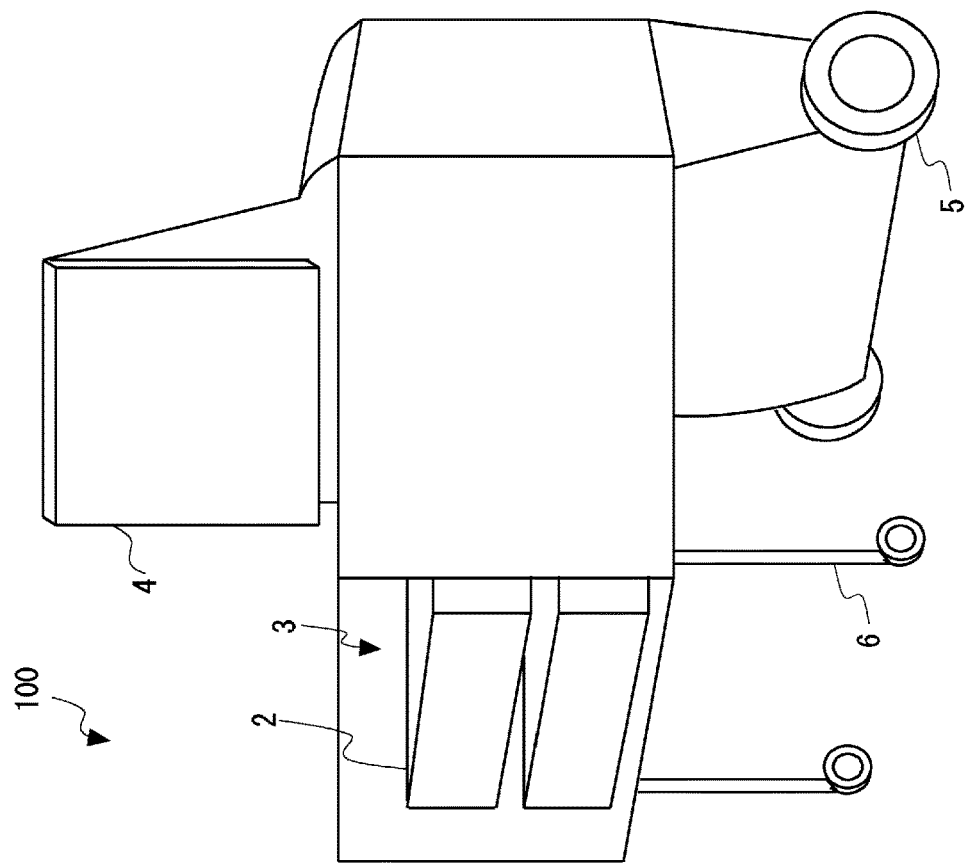
FIG. 1 is a schematic diagram showing an overview of a transportation robot according to an embodiment.
Figure 1:
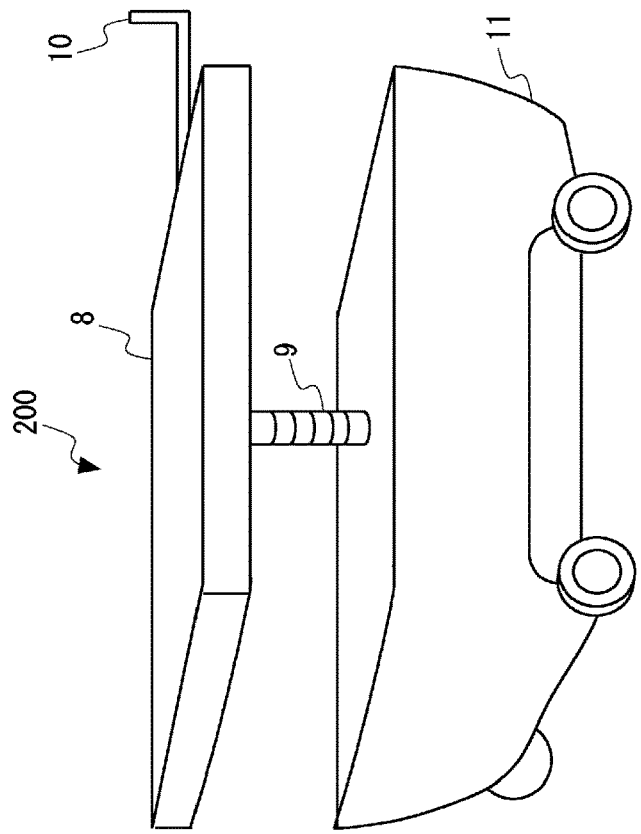

Hereinafter, a transportation system according to an embodiment will be described with reference to the drawings. The transportation system according to the embodiment includes a transportation robot 1. The transportation system is a system in which the transportation robot 1 transports an article(s) (hereinafter referred to as an article). FIG. 1 is a schematic diagram illustrating the transportation robot 1 according to the embodiment. The transportation robot 1 includes an accommodation unit 100 and a traveling unit main body 200.

First, the accommodation unit 100 will be described. The accommodation unit 100 includes an accommodation area 3, a door 4, wheels 5, and a leg part 6.

An article 2 is accommodated in the accommodation area 3. The article 2 may be supported by a support member attached to an inner wall of the accommodation area 3. The article 2 may be an item(s) for utilization (consumption) at the delivery destination such as a beverage sold in a vending machine or the like. Further, a surveillance camera may be conveyed as the article 2.

The door 4 is disposed at the accommodation area 3 and an opened state thereof is shown in FIG. 1. The door 4 is configured to be closable at the time of the transport operation. Note that the transportation robot 1 may not have the door 4.

The accommodation unit 100 is self-standing owing to the wheels 5 and the leg part 6. As shown in FIG. 1, the leg part 6 may include casters. The leg part 6 may be housed at the time of transportation of the article 2.

Next, the traveling unit main body 200 will be described. The traveling unit main body 200 includes a mounting table 8, a first driving unit 9, a second driving unit 10, and a moving unit 11. The first driving unit 9 is also referred to as an elevating unit. The second driving unit 10 is also referred to as an arm unit. The traveling unit main body 200 is designed to fit in a space below the accommodation area 3 of the accommodation unit 100. The traveling unit main body 200 can move the article 2 using the first driving unit 9 and the second driving unit 10.

The mounting table 8 is a table on which the article 2 can be placed and is attached to the first driving unit 9. The first driving unit 9 includes an elevating mechanism and lowers the mounting table 8 when the traveling unit main body 200 and the accommodation unit 100 are coupled to each other. The first driving unit 9 raises the mounting table 8 at the time of accommodating in or taking out the article 2 from the accommodation unit 100. The mounting table 8 may be circular.

The second driving unit 10 is an extendable-and-retractable arm attached to the mounting table 8. The second driving unit 10 can store (accommodate) the article 2 placed on the mounting table 8 in the accommodation area 3. Further, the second driving unit 10 can place the article 2 accommodated in the accommodation area 3 on the mounting table 8. Further, the second driving unit 10 can be housed inside the mounting table 8. There may be a space for housing the second driving unit 10 at the center part of the mounting table 8.

The second driving unit 10 may be an L-shaped arm like that illustrated in FIG. 1, or may be a hand-type arm for gripping the article. The traveling unit main body 200 may accommodate the article 2 by extending the second driving unit 10 with the tip end of the L-shaped arm engaged with the article 2, or may place the article 2 on the mounting table 8 by retracting the second driving unit 10 with the tip end of the L-shaped arm engaged with the article 2 accommodated in the accommodation area 3.

The traveling unit main body 200 travels by the moving unit 11. The traveling unit main body 200 can travel in a state in which it is coupled to the accommodation unit 100 and can even travel in a state in which it is uncoupled from the accommodation unit 100. The traveling unit main body 200 is configured to be able to transport the article 2 in a state in which the traveling unit main body 200 is uncoupled from the accommodation unit 100.

Figure 2:
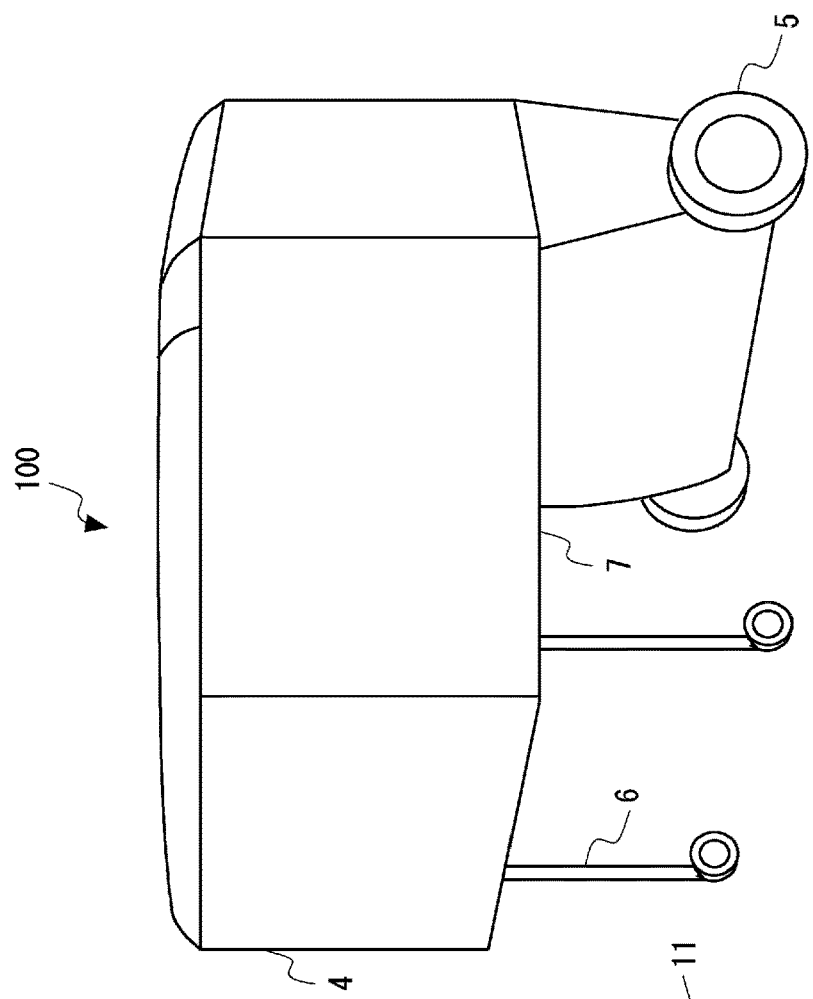
FIG. 2 is a schematic diagram showing a state of the transportation robot according to the embodiment before a traveling unit main body and an accommodation unit are coupled to each other.
Figure 2:
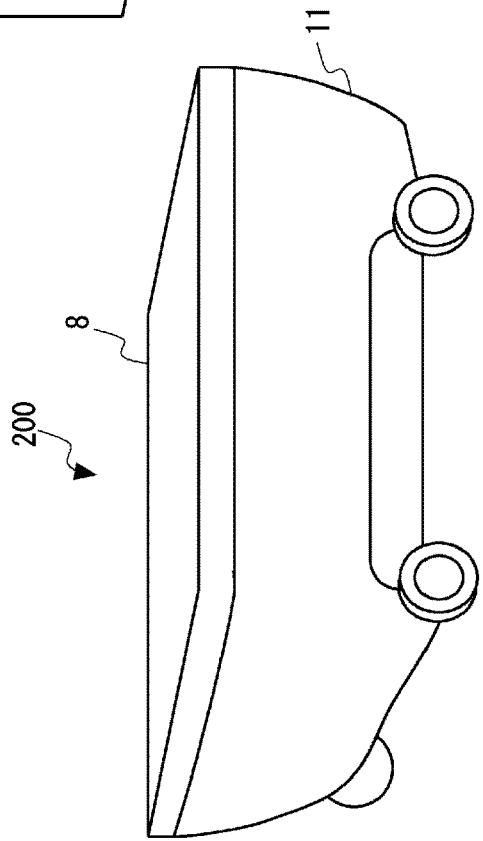

Next, the operation of coupling the accommodation unit 100 and the traveling unit main body 200 with each other will be described with reference to FIG. 2. When coupling the accommodation unit 100 and the traveling unit main body 200 with each other, the first driving unit 9 (not shown) is retracted to lower the mounting table 8. Further, the second driving unit 10 (not shown) is housed inside the mounting table 8. Such state is referred to as the housed state. Note that the housed state may be a state in which each of the first driving unit 9 and the second driving unit 10 is further retracted compared to the state of each of the first driving unit 9 and the second driving unit 10 at the time of operation thereof (taking out the article(s), accommodating the article(s), or the like), and the housed state need not be the most retracted state. The housed state is also referred to as the non-operating state. The accommodation unit 100 shown in FIG. 2 has the door 4 closed. As described above, the transportation robot 1 may not have the door 4.

From such state, the traveling unit main body 200 advances toward the accommodation unit 100 and couples with the accommodation unit 100. The coupling may be performed mechanically or may be performed using magnetic force or the like. For instance, the shape of a bottom surface 7 of the accommodation area 3 and the shape of a top surface of the mounting table 8 may be brought in engagement with each other to thereby couple the traveling unit main body 200 and the accommodation unit 100 with each other. Further, a claw member or the like may be provided to the top surface or the like of the mounting table 8, and a member that engages with the claw member may be provided to the bottom surface 7. Further, the accommodation unit 100 and the traveling unit main body 200 may be coupled to each other by mounting the accommodation unit 100 on the traveling unit main body 200. It is necessary to adopt a configuration in which the accommodation unit 100 and the traveling unit main body 200 can be uncoupled and re-coupled. Note that the leg part 6 may be housed when the traveling unit main body 200 and the accommodation unit 100 are coupled to each other. The operation of the housing mechanism for the leg part 6 will be described later.

Note the accommodation unit 100 and the traveling unit main body 200 may further be electrically coupled. For instance, the accommodation unit 100 is equipped with a battery and power may be supplied to the traveling unit main body 200 when the traveling unit main body 200 and the accommodation unit 100 are coupled to each other. Further, the accommodation unit 100 may receive information from the traveling unit main body 200 when the traveling unit main body 200 and the accommodation unit 100 are coupled to each other and display the received information to a display apparatus disposed to a side surface or the like of the accommodation unit 100.

Figure 3:
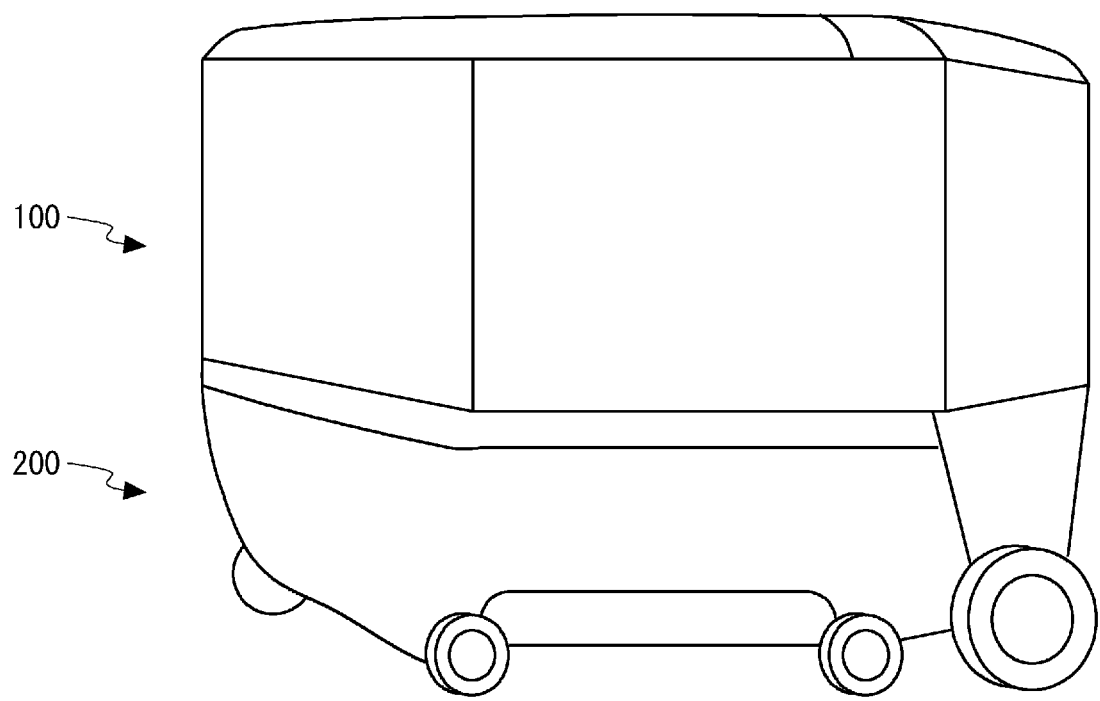
FIG. 3 is a schematic diagram showing a state of the transportation robot according to the embodiment at the time of transport operation.

FIG. 3 shows the transportation robot 1 in a state in which the accommodation unit 100 and the traveling part main body 200 are coupled to each other. The accommodation unit 100 is placed on the traveling unit main body 200 or is coupled to the traveling unit main body 200 to be towed. The traveling unit main body 200 can transport the article 2 (not shown) by traveling in a state in which the traveling unit main body 200 and the accommodation unit 100 are coupled to each other.

Note that the transportation system may include a server for controlling the traveling of the transportation robot 1, or the transportation robot 1 may travel autonomously by generating a transportation route by itself. A system in which the processing is completed within the transportation robot 1 that does not include a server can be included the transportation system according to the embodiment.

Figure 4:
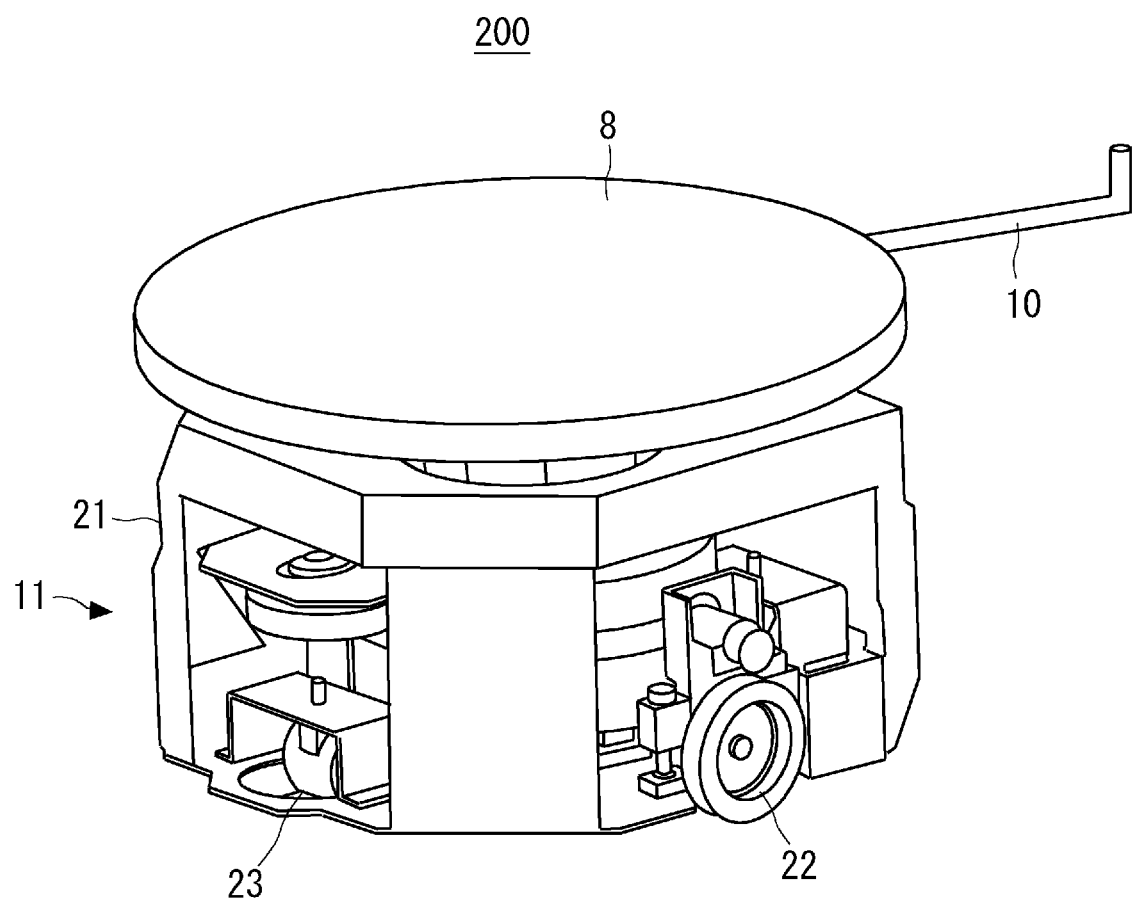
FIG. 4 is a schematic diagram showing a configuration of the traveling unit main body according to the embodiment.
Figure 5:
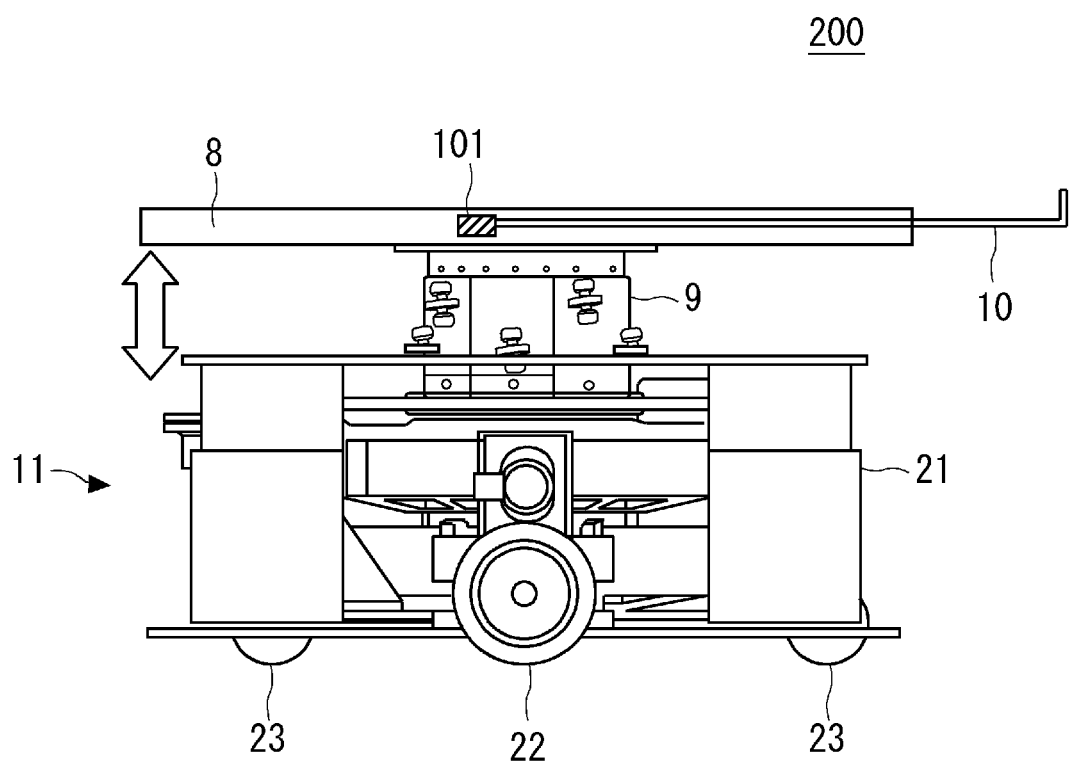
FIG. 5 is a schematic diagram showing a side surface of the traveling unit main body according to the embodiment.
Figure 6:
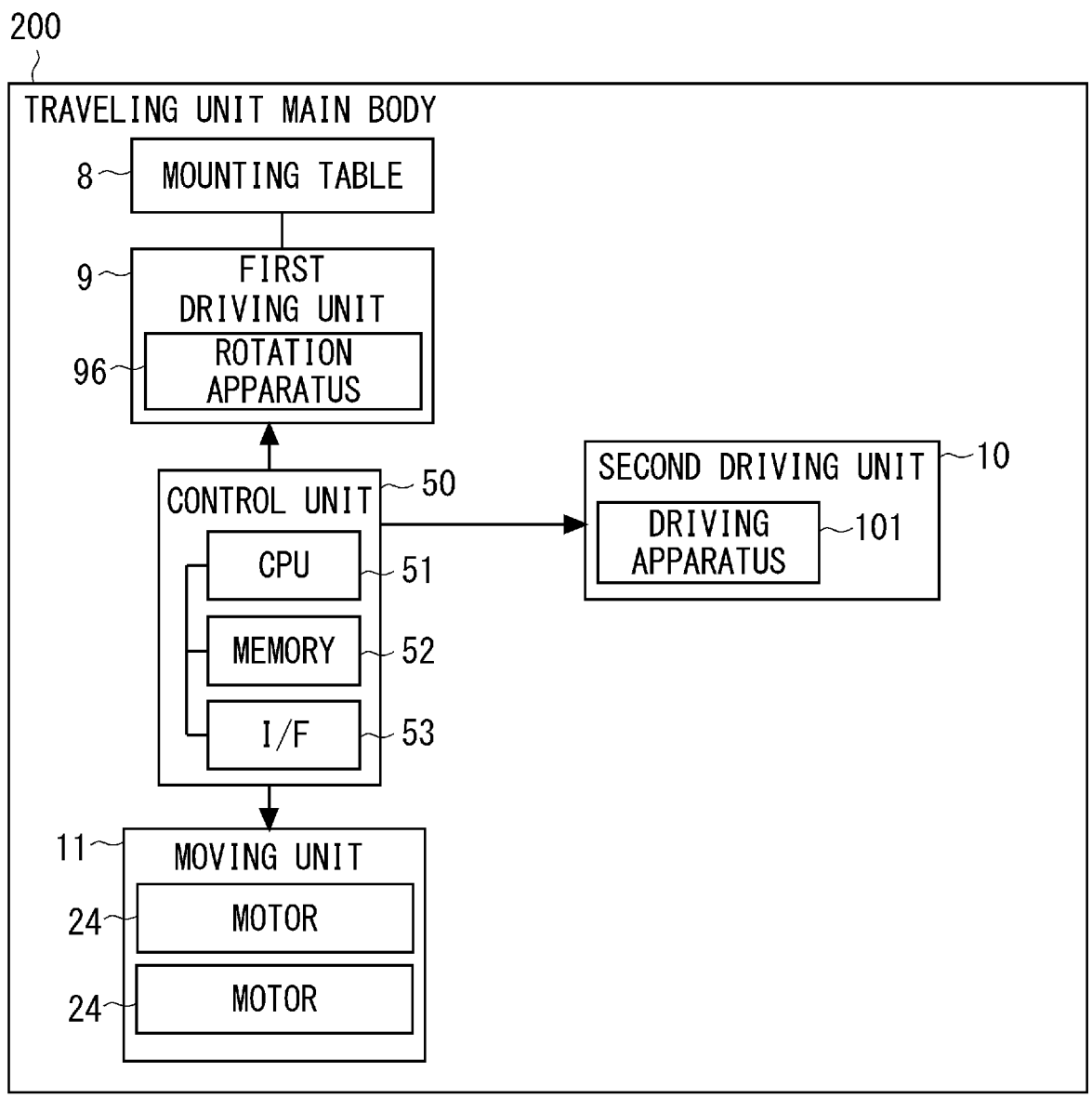
FIG. 6 is a block diagram showing a functional configuration of the traveling unit main body according to the embodiment.

Next, the configuration of the traveling unit main body 200 will be described in detail with reference to FIGS. 4, 5, and 6. FIG. 4 is a perspective view illustrating a configuration of the traveling unit main body 200. FIG. 5 is a side view illustrating a configuration of the traveling unit main body 200. FIG. 6 is a block diagram showing a functional configuration of the traveling unit main body 200.

The traveling unit main body 200 includes the moveable moving unit 11, the first driving unit 9 extendable and retractable in the vertical direction, and the second driving unit 10 extendable and retractable in the horizontal direction. The traveling unit main body 200 includes a control unit 50 that controls the moving unit 11, the first driving unit 9, and the second driving unit 10.

The moving unit 11 includes a moving body main body 21, a pair of left-and-right driving wheels 22 and a pair of front-and-rear driven wheels 23 disposed to the moving body main body 21 in a rotatable manner, and a pair of motors 24 for rotationally driving each of the driving wheels 22. Each of the motors 24 rotates each of the driving wheels 22 through a speed reducer. Each of the motors 24 causes each of the driving wheels 22 to rotate in accordance with the control signal transmitted from the control unit 50, thereby the moving body main body 21 can be moved to an arbitrary position. Note that the above-described configuration of the moving unit 11 is an example and it not limited thereto. For instance, the number of the driving wheels 22 and the driven wheels 23 of the moving unit 11 may be any number, and any configuration may be adopted as long as the position of the moving body main body 21 can be moved to an arbitrary position.

The first driving unit 9 may be configured as an extendable-and-retractable mechanism of a telescopic type that is extendable and retractable in the vertical direction. A rotation apparatus 96 is configured of a rotation mechanism for axially rotating a columnar structure, a motor for driving the rotation mechanism, and the like. The configuration of the first driving unit 9 may be arbitrary.

The driving unit main body 200 can convey the article by loading the article on the mounting table 8. The second driving unit 10 is attached to the mounting table 8. Note that the second driving unit 10 may be attached to a top surface or a bottom surface of the mounting table 8.

Referring to FIG. 5, a driving apparatus 101 is attached to the second driving unit 10. The driving apparatus 101 is attached to a guide rail mechanism (not shown) disposed inside the mounting table 8, and can move the second driving unit 10 in a horizontal direction. Further, the driving apparatus 101 may further include a rotating mechanism for axially rotating the second driving unit 10.

Note that the driving unit main body 200 may be provided with a claw member or the like for coupling with the accommodation unit 100. The claw member may be configured to be operable.

Referring to FIG. 6, the control unit 50 controls the moving unit 11, the first driving unit 9, and the second driving unit 10. The control unit 50 can control the rotation of each of the driving wheels 22 and move the moving body main body 21 to an arbitrary position by transmitting a control signal to each of the motors 24 of the moving unit 11. The control unit 50 can cause the columnar mechanism to extend and retract in the axial direction and control the height of the mounting table 8 by transmitting the control signal to the rotation apparatus 96 of the first driving unit 9. Further, the control unit 50 can control the position of the tip end of the arm in the horizontal direction by transmitting the control signal to the driving apparatus 101 of the second driving unit 10. Note that the control unit 50 may control coupling between the traveling unit main body 200 and the accommodation unit 100 by transmitting the control signal to a coupling mechanism for coupling the traveling unit main body 200 and the accommodation unit 100 with each other.

The control unit 50 may control the movement of the traveling unit main body 200 by performing known controls such as feedback control, robust control, and the like based on the rotation information of the driving wheels 22 detected by the rotation sensor provided to the driving wheels 22. The control unit 50 may control the moving unit 11, the first driving unit 9, and the second driving unit 10 based on information such as the distance information detected by a camera or a distance sensor such as an ultrasonic sensor provided for the traveling unit main body 200, the map information of the movement environment, and the like.

The control unit 50 has a hardware configuration having a microcomputer at the center thereof, the microcomputer being configured of, for instance, a CPU (Central Processing Unit) 51 that performs the control processing, the calculation processing, and the like, a memory 52 configured of a ROM (Read Only Memory) or a RAM (Random Access Memory) storing a control program, a calculation program, or the like executed by the CPU 51, and an interface unit (I/F) 53 for performing input and output of a signal from and to the outside. The CPU 51, the memory 52, and the interface unit 53 are mutually connected with one another via a data bus or the like.

Figure 7:
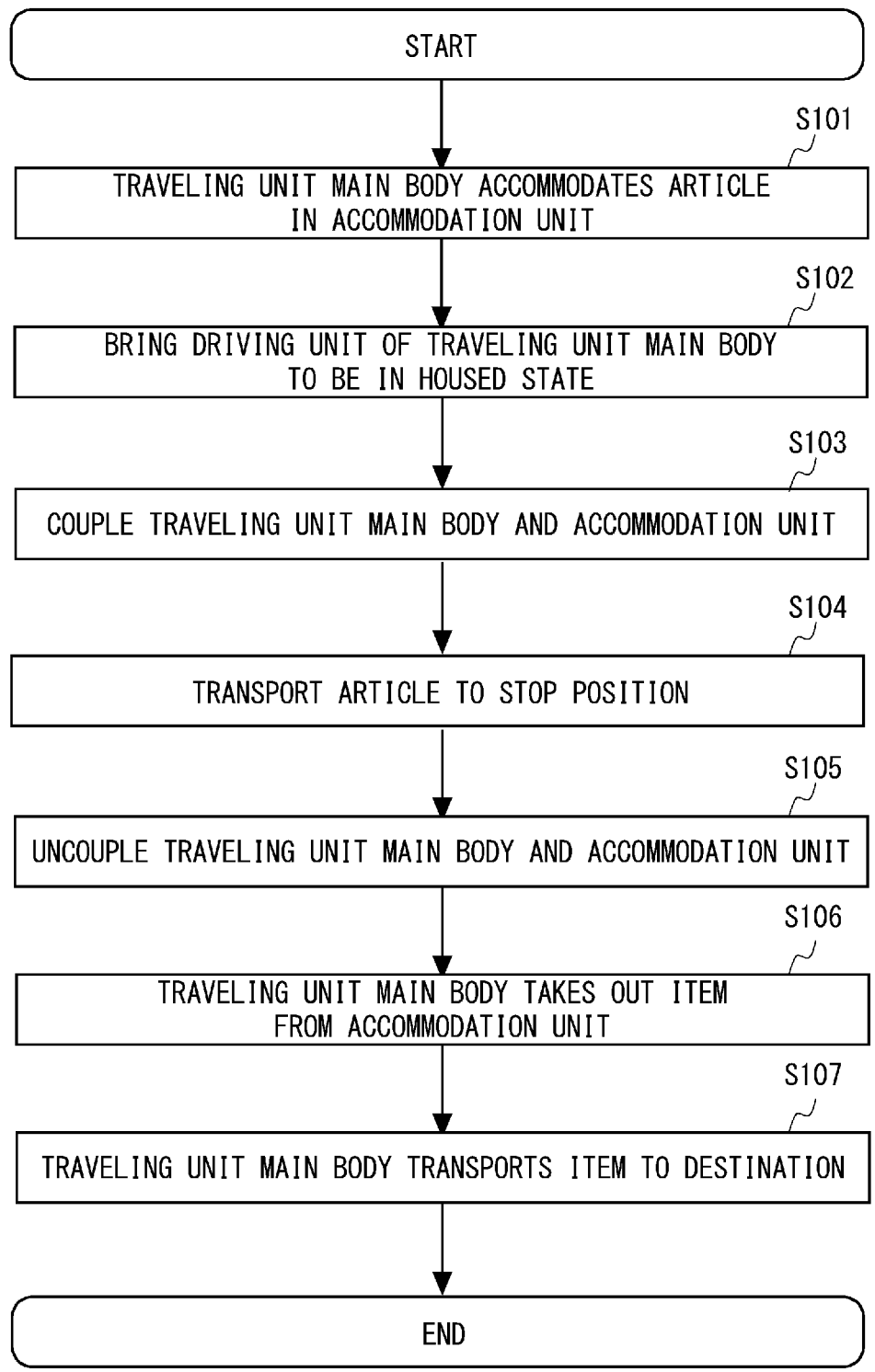
FIG. 7 is a flowchart showing operations of the transportation robot according to the embodiment.

Next, an example of the transportation method according to the embodiment will be described with reference to FIG. 7. The accommodation unit 100 is not coupled to the traveling unit main body 200, and the article 2 to be transported is placed on the mounting table 8. First, the traveling unit main body 200 moves to the front of the accommodation area for the accommodation unit 100 and stores (accommodates) the article 2 in the accommodation unit 100 using the first driving unit 9 and the second driving unit 10 (Step S101). Next, the traveling unit main body 200 brings the first driving unit 9 and the second driving unit 10 to be in the housed state (Step S102). Next, the traveling unit main body 200 enters the lower part of the accommodation unit 100 so as to be coupled to the accommodation unit 100 (Step S103). Note that an example in which the traveling unit main body 200 does not bring the first driving unit 9 and the second driving unit 10 to be in the housed state can also be included in the present embodiment.

Next, the traveling unit main body 200 transports, in a state in which it is coupled to the accommodation unit 100, the article 2 to a stop position in the vicinity of the destination (Step S104). The stop position may be determined as appropriate in accordance with the size of the accommodation unit 100 and the position in the vicinity of the destination at which the traveling unit main body 200 coupled to the accommodation unit 100 can stop. Next, the traveling unit main body 200 and the accommodation unit 100 are uncoupled (Step S105). Next, the traveling unit main body 200 operates independently of the accommodation unit 100 and takes out the article 2 from the accommodation unit 100 and places the article 2 on the mounting table 8 using the first driving unit 9 and the second driving unit 10 (Step S106). Finally, the traveling unit main body 200 transports the article 2 from the stop position to the destination (Step S107). The traveling unit main body 200 may put the article 2 on a shelf or the like disposed at the destination using the first driving unit 9 and the second driving unit 10.

Figure 8:
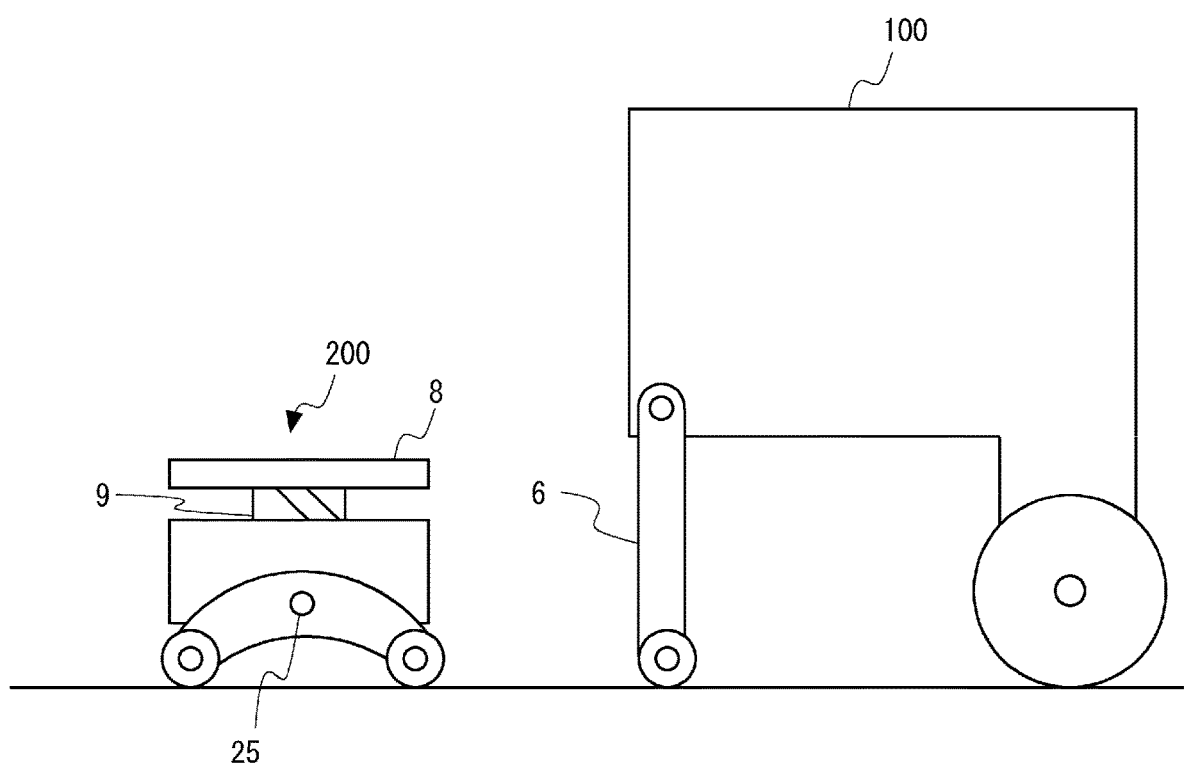
FIG. 8 is a schematic diagram showing a state of the transportation robot according to the embodiment before the traveling unit main body and the accommodation unit are coupled to each other.

Next, an example of the coupling method in a case where the accommodation unit 100 includes a mechanism for taking in and taking out the leg part 6 will be described with reference to FIGS. 8 to 12. FIG. 8 illustrates the state in which the accommodation unit 100 and the traveling unit 200 are uncoupled, and the first driving unit 9 of the traveling unit main body 200 is in the housed state. Therefore, the traveling unit main body 200 can enter the lower part of the accommodation unit 100 by moving toward the accommodation unit 100. The accommodation unit 100 is self-standing owing to the leg part 6.

Note that the main body part of the traveling unit main body 200 is rotatable around a shaft 25. That is, the traveling unit main body 200 raises the mounting table 8 in a state in which an elevating axis of the first driving unit 9 (an elevating unit) is inclined from the vertical direction.

Figure 9:
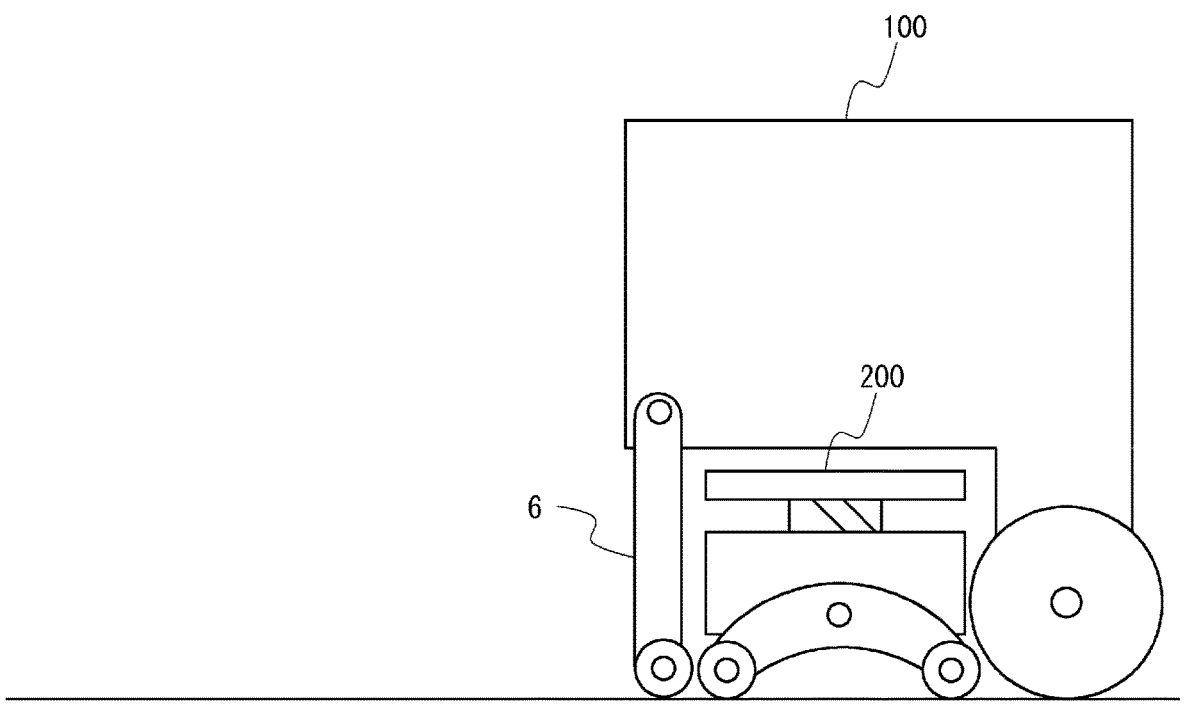
FIG. 9 is a schematic diagram showing a state in which the traveling unit main body has entered a lower part of the accommodation unit according to the embodiment.

FIG. 9 shows a state in which the traveling unit main body 200 has entered the lower part of the accommodation unit 100. Here, it is desirable to house the leg part 6 of the accommodation unit 100 since it is not necessary at the time of the transport operation. The leg part 6 is configured to be housable, but in FIG. 9, it cannot be housed since it is contact with the ground.

Figure 10:
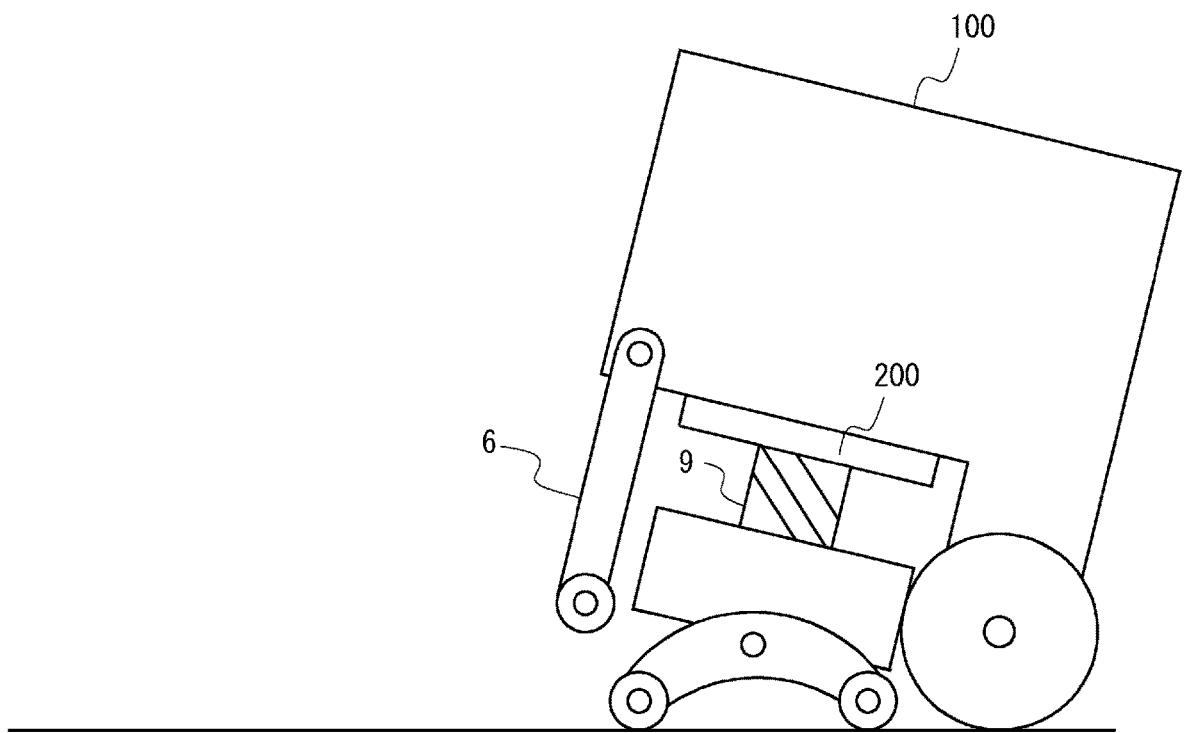
FIG. 10 is a schematic diagram showing an operation of levitating the leading end of a leg part of the accommodation unit according to the embodiment.
Figure 11:
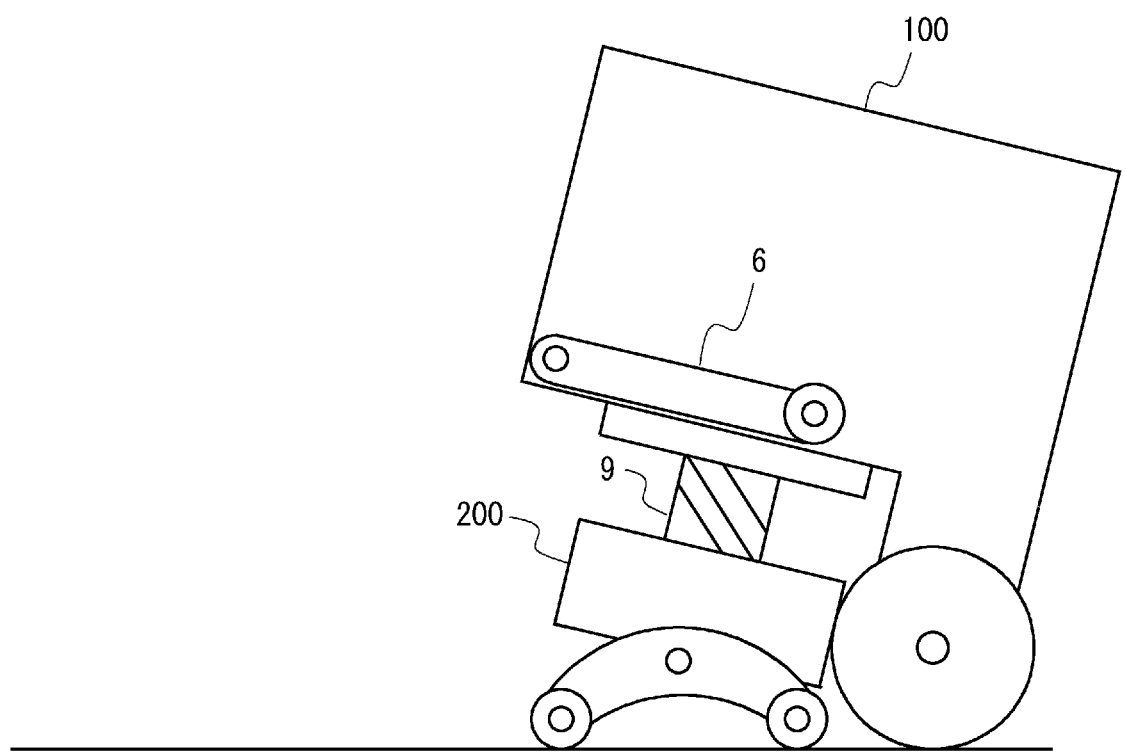
FIG. 11 is a schematic diagram showing a state in which the leg part is housed in the accommodation unit according to the embodiment.

Accordingly, as shown in FIG. 10, the traveling unit main body 200 extends and retracts the first driving unit 9 in a state in which the elevating axis of the first driving unit 9 is inclined from the vertical direction. Thus, the leading end of the leg part 6 is brought to a levitated state. When the leading end of the leg part 6 is brought to a levitated state, the leg part 6 is housed as shown in FIG. 11. The leg part 6 may be accommodated inside the accommodation unit 100. The housing operation of the leg part 6 may be performed mechanically in association with the extension of the first driving unit 9. The housing operation may instead be performed electrically and not in association with the extension of the first driving unit 9.

Figure 12:
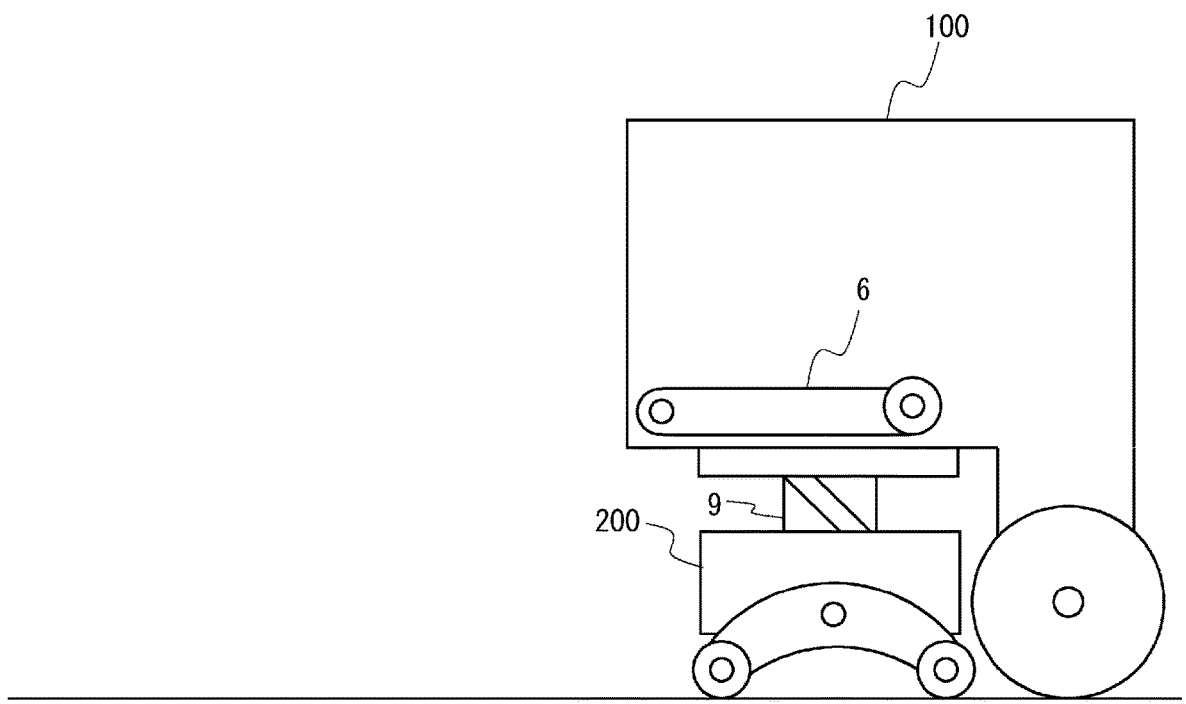
FIG. 12 is a schematic diagram showing a state in which the traveling unit main body and the accommodation unit are coupled to each other.

After accommodating the leg part 6, the traveling unit main body 200 retracts the first driving unit 9 to bring the traveling unit main body 200 to be in the housed state as shown in FIG. 12. The leg part 6 is housed, and the accommodation unit 100 is supported by the traveling unit main body 200. Through the above-described operations, the transportation robot can travel with the leg part 6 housed and the traveling unit main body 200 and the accommodation unit 100 coupled to each other.

Note that the operation of levitating the leading end of the leg part 6 shown in FIG. 10 can be performed from outside the accommodation unit 100. By the method illustrated in FIG. 13, even when the width of the traveling unit main body 200 is larger than the interval between the two leg parts 6, each leg part 6 can be housed.

Figure 13:
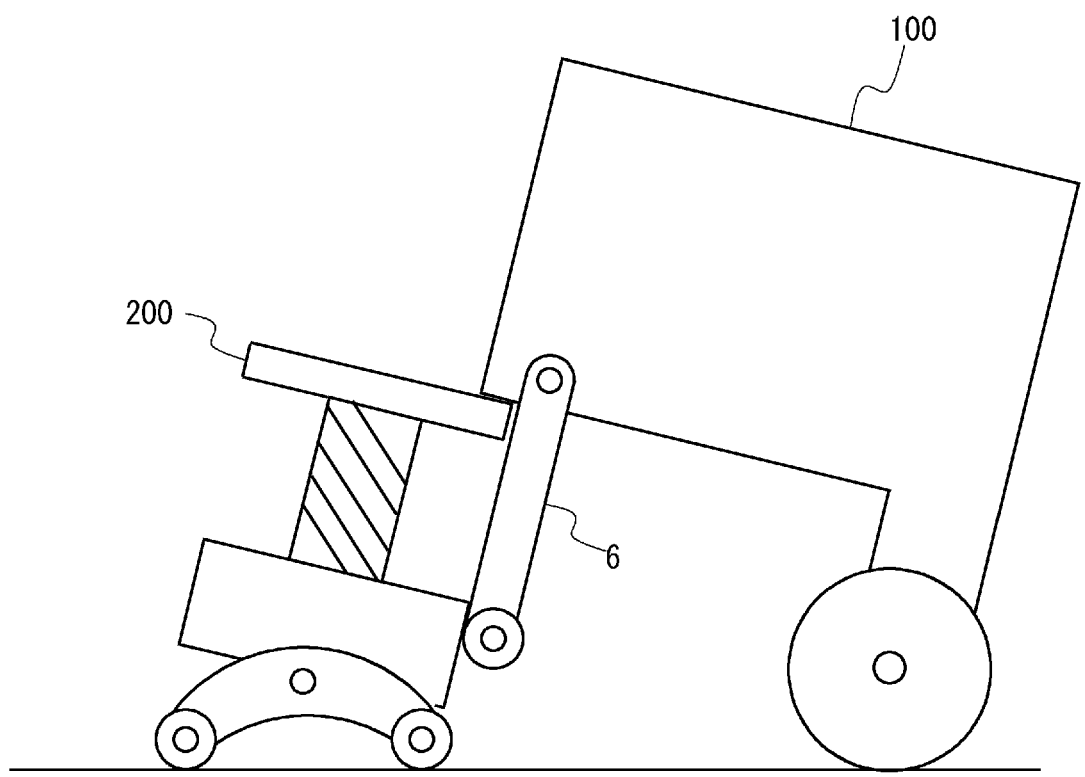
FIG. 13 is a schematic diagram showing an operation performed by the traveling unit main body according to the embodiment of levitating the leading end of the leg part from the outside of the accommodation unit.
Figure 14:
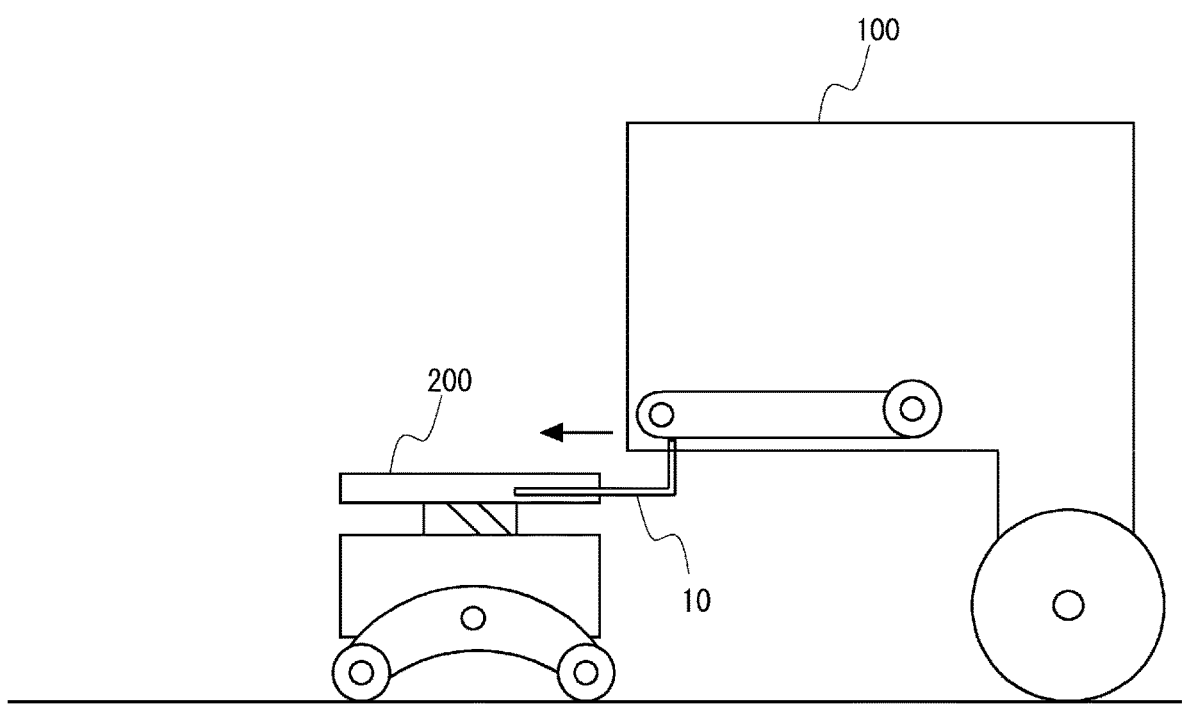
FIG. 14 is a schematic diagram showing an operation performed by the traveling unit main body according to the embodiment of pulling the accommodation unit to the traveling unit main body using an arm.

After the leg part 6 is housed by the method illustrated in FIG. 13, the traveling unit main body 200 pulls the accommodation unit 100 to the traveling unit main body 200 using the second driving unit 10 as shown in FIG. 14. Thus, it is possible for the traveling unit main body 200 and the accommodation unit 100 to be coupled to each other to transit to the coupled state as shown in FIG. 12.

Figure 15A:
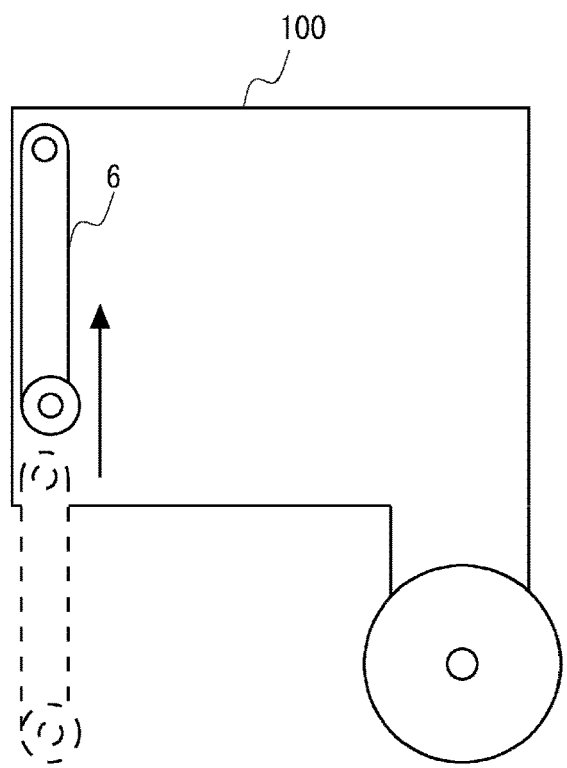
FIG. 15A is a schematic diagram illustrating a method for housing the leg part in the accommodation unit according to the embodiment.
Figure 15B:
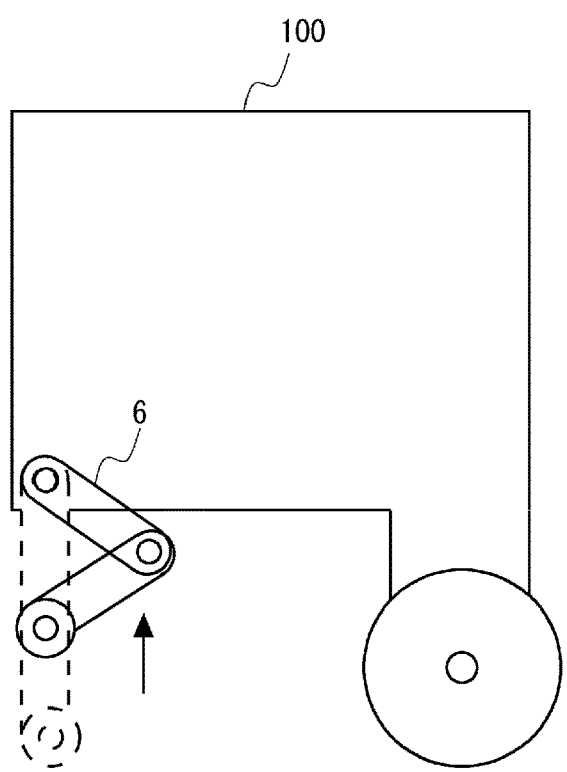
FIG. 15B is a schematic diagram illustrating a method for housing the leg part in the accommodation unit according to the embodiment.

Note that the method of housing the leg part 6 is not limited to the above-described rotating operation and may instead be an arbitrary operation. For instance, the method of accommodating the leg part 6 may be an operation of drawing-in shown in FIG. 15A or may be a folding operation shown in FIG. 15B.

Figure 16:
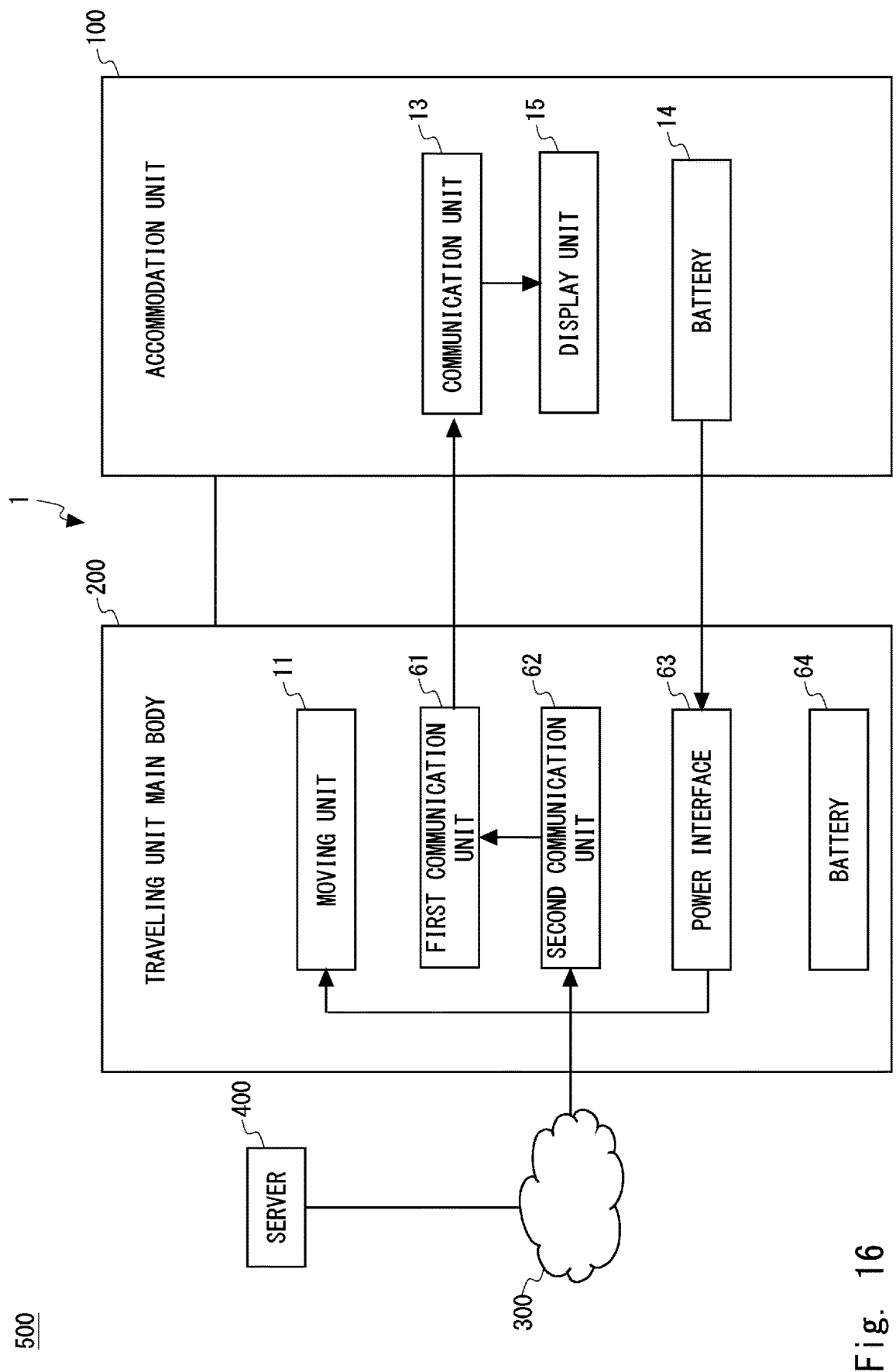
FIG. 16 is a block diagram showing an electrical connection between the traveling unit main body and the accommodation unit.

Next, the coupling of the accommodation unit 100 to the traveling unit main body 200 in the state in which the accommodation unit 100 and the traveling unit main body 200 are electrically coupled to each other will be described with reference to FIG. 16. FIG. 16 is a block diagram showing a functional configuration of a transportation system 500 according to the embodiment. Note that a part of the function is omitted where appropriate in FIG. 16. The transportation system 500 includes the transportation robot 1 and the server 400. Note that as described above, the transportation system 500 does not have to include the server 400.

The accommodation unit 100 includes a communication unit 13, a battery 14, and a display unit 15 such as a display or the like. The traveling unit main body 200 includes the moving unit 11, a first communication unit 61, a second communication unit 62, a power interface 63, and a battery 64.

The accommodation unit 100 is coupled to the traveling unit main body 200. In the coupled state, the communication unit 13 of the accommodation unit 100 and the first communication unit 61 of the traveling unit main body 200 are electrically connected together. The communication unit 13 and the first communication unit 61 are communication interfaces.

Further, the battery 14 equipped to the accommodation unit 100 is connected to the power interface 63 of the traveling unit main body 200 and can supply power to the moving unit 11 of the traveling unit main body 200. Note that the accommodation unit 100 may charge the battery 64 of the traveling unit main body 200 and the power may be supplied from the battery 64 to the moving unit 11. Note that depending on the remaining amount of the battery 14, the traveling unit main body 200 may travel using the power of the battery 64.

With the above-described configuration, the transportation robot 1 can travel using the power supplied from the accommodation unit 100 in the coupled state. Therefore, even when the traveling unit main body 200 cannot be equipped with a high-capacity battery, the transportation robot 1 can still travel a sufficient distance. Note that after the traveling unit main body 200 and the accommodation unit 100 are uncoupled, the traveling unit main body 200 performs the operation of taking out the article from the accommodation unit 100 using the power of the battery 64, and the like.

The second communication unit 62 of the traveling unit main body 200 is a communication interface between the traveling unit main body 200 and the network 300. The traveling unit main body 200 acquires a traveling route from the server 400 via the network 300 and travels autonomously. Note that the traveling unit main body 200 includes a sensor such as a camera or the like for performing autonomous traveling. The network 300 may be a generally-used radio network such as wireless network protocols Wi-Fi™, 4G, 5G, or the like.

Further, the traveling unit main body 200 acquires the information to be displayed on the display unit 15 of the accommodation unit 100 from the network 300. The information to be displayed may be information on the conveyed article(s), advertising information, and the like, and may be information indicating whether or not the article is being conveyed. The second communication unit 62 transmits the acquired information to the accommodation unit 100 via the first communication unit 61.

With the above-described configuration, the advertising information or the like acquired by the traveling unit main body 200 can be displayed on the display unit 15 installed on a side surface or the like of the accommodation unit 100.

Note that in the description given above, the traveling unit main body 200 includes the first driving unit 9 and the second driving unit 10, however, the traveling unit main body 200 may only include the second driving unit 10. The traveling unit main body 200 may only include, for instance, a hand-type arm. In such a case, the traveling unit main body 200 may accommodate the arm and be coupled to the accommodation unit 100 using the coupling mechanism such as a claw member or the like. The driving unit included in the traveling unit main body may be of any configuration as long as at least one of the operations of taking out or storing an article from or in the accommodation unit and transporting the article taken out from the accommodation unit can be performed. The traveling unit main body may transport an article using, for instance, an elevating arm.

Note that the traveling unit main body 200 may be configured of a plurality of transportation robots, and the plurality of transportation robots may transport the accommodation unit 100. When coupling the accommodation unit 100 and the traveling unit main body, each of the plurality of transportation robots is coupled to the accommodation unit 100.

Lastly, the effect of the present embodiment will be described. According to the above-described transportation robot and the transportation method, it is not only possible to transport an article but also to perform a series of tasks including loading and unloading of the article, whereby it is possible to transport an article efficiently. Further, it is possible to change the quantity, the type, and the like of the article to be transported by varying the shape, the size, and the like of the accommodation unit.

Further, the traveling unit main body may travel in the state in which the traveling unit main body is coupled to the accommodation unit and the driving unit is in the housed state. Thus, the transportation robot can travel in a more compact shape.

The program executed by the traveling unit main body 200 includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

Note that the present disclosure is not limited to the above-described embodiments, and can be appropriately changed without departing from the spirit of the present disclosure.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A transportation system comprising a transportation robot that comprises a traveling unit main body and an accommodation unit for accommodating an article, the traveling unit main body and the accommodation unit being configured to be coupled to each other, wherein:
   the accommodation unit comprises an accommodation area, a door, wheels, and a leg part extending from a base of the accommodation area;
   the traveling unit main body and the accommodation unit are adapted to be uncoupled and re-coupled;
   the traveling unit main body comprises an elevating mechanism and an extendable and retractable arm configured to perform at least one of operations of taking out or storing the article from or in the accommodation unit and transporting the article taken out from the accommodation unit;
   the traveling unit main body is configured to perform at least one of the operations of taking out, storing, and transporting the article using the elevating mechanism or the extendable and retractable arm in a state in which the traveling unit main body and the accommodation unit are uncoupled; and
   the elevating mechanism is configured to raise the accommodation unit such that the leg part is in a levitated state in which the leg part may be housed in the accommodation unit, and after the elevating mechanism lowers the accommodation unit, the extendable and retractable arm is configured to pull the accommodation unit to the traveling unit main body to couple the traveling unit main body and the accommodation unit.

2. The transportation system according to claim 1, wherein the traveling unit main body travels in a state in which the traveling unit main body and the accommodation unit are coupled to each other and the elevating mechanism and the extendable and retractable arm are in a housed state.

3. The transportation system according to claim 1, wherein the traveling unit main body is adapted to move independently of the accommodation unit in a state in which the traveling unit main body and the accommodation unit are uncoupled.

4. The transportation system according to claim 1, wherein
the traveling unit main body is configured to travel in a state in which the traveling unit main body and the accommodation unit are coupled to each other and the elevating mechanism and the extendable and retractable arm are in a housed state, and
the traveling unit main body is configured to perform at least one of the operations of taking out or storing an article from or in the accommodation unit in a state in which the traveling unit main body and the accommodation unit are uncoupled and the extendable and retractable arm is in a raised state.

5. The transportation system according to claim 1, wherein
the accommodation unit is provided with a mechanism for taking in and taking out a leg part,
the accommodation unit is configured to house the leg part and be supported by the traveling unit main body in a state in which the traveling unit main body and the accommodation unit are coupled to each other, and
the accommodation unit is configured to be self-standing by the leg part in a state in which the traveling unit main body and the accommodation unit are uncoupled.

6. The transportation system according to claim 1, wherein
the accommodation unit has a battery mounted thereon, and
the traveling unit main body is adapted to travel using power supplied from the battery in a state in which the traveling unit main body and the accommodation unit are coupled to each other.

7. The transportation system according to claim 1, wherein
the accommodation unit comprises an interface with the traveling unit main body and a display unit, and
the accommodation unit is configured to cause the display unit to display information acquired from the traveling unit main body.

8. A transportation method for a transportation robot that comprises a traveling unit main body and an accommodation unit for accommodating an article, the traveling unit main body and the accommodation unit being configured to be coupled to each other, wherein:
the accommodation unit comprises an accommodation area, a door, wheels, and a leg part extending from a base of the accommodation area;
the traveling unit main body and the accommodation unit are adapted to be uncoupled and re-coupled;
the traveling unit main body comprises an elevating mechanism and an extendable and retractable arm configured to perform at least one of operations of taking out or storing the article from or in the accommodation unit and transporting the article taken out from the accommodation unit, the method comprising causing the traveling unit main body to perform at least one of the operations of taking out, storing, and transporting the article using the elevating mechanism or the extendable and retractable arm in a state in which the traveling unit main body and the accommodation unit are uncoupled; and
the elevating mechanism is configured to raise the accommodation unit such that the leg part is in a levitated state in which the leg part may be housed in the accommodation unit, and after the elevating mechanism lowers the accommodation unit, the extendable and retractable arm is configured to pull the accommodation unit to the traveling unit main body to couple the traveling unit main body and the accommodation unit.

9. A non-transitory computer readable medium storing a computer program for causing a computer to perform a transportation method for a transportation robot that comprises a traveling unit main body and an accommodation unit for accommodating an article, the traveling unit main body and the accommodation unit being configured to be coupled to each other, wherein:
the accommodation unit comprises an accommodation area, a door, wheels, and a leg part extending from a base of the accommodation area;
the traveling unit main body and the accommodation unit are adapted to be uncoupled and re-coupled;
the traveling unit main body comprises an elevating mechanism and an extendable and retractable arm configured to perform at least one of operations of taking out or storing the article from or in the accommodation unit and transporting the article taken out from the accommodation unit, the method comprising causing the traveling unit main body to perform at least one of the operations of taking out, storing, and transporting the article using the elevating mechanism or the extendable and retractable arm in a state in which the traveling unit main body and the accommodation unit are uncoupled; and
the elevating mechanism is configured to raise the accommodation unit such that the leg part is in a levitated state in which the leg part may be housed in the accommodation unit, and after the elevating mechanism lowers the accommodation unit, the extendable and retractable arm is configured to pull the accommodation unit to the traveling unit main body to couple the traveling unit main body and the accommodation unit.

\* \* \* \* \*